United States Patent [19]

Noguchi et al.

[11] Patent Number: 4,969,718
[45] Date of Patent: Nov. 13, 1990

[54] ACTIVE LIQUID-CRYSTAL MULTI-COLOR DISPLAY PANEL STRUCTURE HAVING TRIANGULAR TRIAD OF COLOR DISPLAY PIXELS AND SPLIT PIXEL ELECTRODES

[75] Inventors: Kesao Noguchi; Shouji Ichikawa, both of Tokyo, Japan

[73] Assignee: NEC Corporation, Japan

[21] Appl. No.: 212,191

[22] Filed: Jun. 27, 1988

Related U.S. Application Data

[63] Continuation-in-part of Ser. No. 823,104, Jan. 27, 1986, abandoned.

[30] Foreign Application Priority Data

Jan. 25, 1985 [JP] Japan .................................. 60-11929
Jan. 29, 1985 [JP] Japan .................................. 60-14752
Jan. 29, 1985 [JP] Japan .................................. 60-14753

[51] Int. Cl.⁵ .................................................. G02F 1/13
[52] U.S. Cl. .................................. 350/339 F; 350/333; 350/334; 350/336; 340/784
[58] Field of Search .................. 350/333, 334, 339 F, 350/336; 340/703, 784, 765

[56] References Cited

U.S. PATENT DOCUMENTS

| 4,600,274 | 7/1986 | Morozumi | 350/339 F |
| 4,728,172 | 3/1988 | Cannella | 350/336 |
| 4,745,406 | 5/1988 | Hayashi et al. | 340/784 |
| 4,775,861 | 10/1988 | Saito | 350/333 |
| 4,781,438 | 11/1988 | Noguchi | 350/339 F |
| 4,791,415 | 12/1988 | Takahashi | 340/784 |
| 4,800,375 | 1/1989 | Silverstein et al. | 340/703 |
| 4,812,017 | 3/1989 | Piper | 350/339 F |
| 4,822,142 | 4/1989 | Yasui | 350/339 F |
| 4,834,505 | 5/1989 | Migliorato et al. | 350/333 |
| 4,855,724 | 8/1989 | Yang | 340/784 |

FOREIGN PATENT DOCUMENTS

| 0158367 | 10/1985 | European Pat. Off. | 350/332 |
| 0200221 | 11/1984 | Japan | 350/330 |
| 0097322 | 5/1985 | Japan | 340/784 |
| 0207118 | 10/1985 | Japan | 350/333 |
| 0218626 | 11/1985 | Japan | 350/332 |

Primary Examiner—Stanley D. Miller
Assistant Examiner—Tai Van Duong
Attorney, Agent, or Firm—Laff, Whitesel, Conte & Saret

[57] ABSTRACT

A liquid-crystal multi-color display panel structure comprising a transparent substrate, pixel electrodes disposed on the substrate to form a matrix having columns each in a first direction and rows each in a second direction perpendicular to the first direction, the pixel electrodes consisting of those of first, second and third types respectively for displaying in first, second and third preselected colors, the pixel electrodes of each of row being each one and a half pitch distance offset from the pixel electrodes of the adjacent row, signal lines disposed between adjacent two columns of the matrix and extending in the first direction, scanning lines disposed in every other intervals between adjacent two rows of the matrix and extending in the second direction, switching transistors each having a first terminal connected to one of the pixel electrodes, a second terminal connected to one of the signal lines, a third terminal connected to one of the scanning lines to control the conductivity between the first and second terminals, the third terminals of the transistors associated with the pixel electrodes of adjacent two rows of the matrix on both sides of the scanning lines being connected to the scanning line between the adjacent two rows, whereby one of the pixel electrodes of the first type in one of the adjacent two rows and each of the pixel electrodes of the second and third types in the other of the adjacent two rows form a generally triangular triad of color display pixels.

4 Claims, 9 Drawing Sheets

ACTIVE LIQUID-CRYSTAL MULTI-COLOR DISPLAY PANEL STRUCTURE HAVING TRIANGULAR TRIAD OF COLOR DISPLAY PIXELS AND SPLIT PIXEL ELECTRODES

This application is a continuation-in-part of application Ser. No. 06/823,104, filed Jan. 27, 1986 now abandoned.

FIELD OF THE INVENTION

The present invention relates to the display of multi-color images and, more particularly, to an active-matrix liquid-crystal multi-color display panel structure.

DEFINITIONS

For convenience of expression, the following specification will use the following terms, which may be defined, as follows:

Offset distance of one-half pitch:

FIG. 5B includes a notation "½P" which identifies an offset of one-half pitch. In FIG. 5B, the pixels having the same color code letter (e.g. B1, B2) on adjacent rows are offset from each other by one-half pitch (½P). It is totally irrelevant whether the measurement is taken with respect to an edge, a center point, or any other specific place, as long as the measurements are between corresponding points in successive pixels, carrying the same color code.

Offset distance of one and one-half pitch:

In FIG. 6B, for example, the pixels on adjacent rows are offset by one and one-half pixel. For example, blue pixel B11 is offset from the blue pixel B12 in the adjacent row carrying the same color code "B". This distance is shown in FIG. 6B by "p" and "½p" (meaning pitch and one-half pitch), as indicated at the bottom of the figure. Again, a pitch length may be measured between any two corresponding points in neighboring pixels having the same color code notation "B, G, R."

Triad or Triangular Pattern:

An arrangement of three pixels bearing the three different color code letters "B, G, R". By way of example, three "triads" are indicated by dot-dashed lines in FIG. 6B, one of which is labeled "Triad". The term "triad" refers to the arrangement of three pixels and not to the dot-dashed triangles which are shown in FIG. 6B to identify a triad. Although the triangles are shown with their apexes at the centers of the pixels, that is totally irrelevant.

BACKGROUND OF THE INVENTION

An active-matrix liquid-crystal multi-color display panel structure has a matrix of color display pixels which are arranged in rows and columns and which have semiconductor switching devices respectively incorporated therein. Such semiconductor switching devices are typically thin-film transistors of, for example, the amorphous-silicon field-effect design. Development of such multi-color display panel structures have significantly increased the display capacities of liquid-crystal display devices in general and provides ease of using multi-color display capabilities of liquid crystals.

One of the methods of producing multi-color images on liquid-crystal display panels is to use a dichroic pigment dissolved as a guest in a host liquid crystal. Another method is to use color filters provided in association with pixel electrodes across a layer of liquid crystal. The latter method is presently more frequently used than the former because of the extreme difficulties encountered in producing images of multiple colors by the guest-host method.

As well known in the art, a liquid-crystal multi-color display panel structure using color filters comprises two transparent substrates having a layer of liquid crystal sandwiched therebetween. A common electrode defining a display area of the panel structure is attached to one of these transparent substrates and an array of color filters selectively assigned to, typically, three primary colors of red, green and blue is disposed on this substrate. On the other of the two transparent substrates is formed a multiplicity of color display pixels arranged in rows and columns in such a manner as to be in registry with the individual color filters, respectively. Each of the color display pixels is composed of a pixel electrode and a switching device which is typically implemented by a thin-film field-effect transistor. The pixel electrode of each color display pixel is capacitively coupled with the common electrode across the layer of liquid crystal provided between the two substrates. The thin-film field-effect transistor implementing the switching device of each pixel has its gate connected to a row or scanning line of the pixel array and its current path connected between the pixel electrode and a column or signal line of the pixel array.

When the switching device forming part of a particular pixel is actuated to turn on with a scanning signal applied through the row line to the gate of the transistor, the liquid crystal intervening between the common electrode and the pixel electrode of the pixel is activated to allow passage of light therethrough. Light having an appropriate wavelength selected for the color filter associated with the particular color display pixel is thus passed through the color filter so that a picture element in any of a total of eight different colors can be produced by a triad of pixels respectively assigned to the three primary colors. If the field generated in the liquid crystal is varied continuously by controlling the voltage to be applied to each of the pixel electrodes, a full-color picture can be produced which is composed of picture elements with steplessly varied color tones.

In a known liquid-crystal multi-color display panel structure of the type using color filters, image display pixels individually assigned to the three primary colors recur in each of the rows or in each of the columns of the pixel array. A display panel structure having such pixel arrangement has a drawback in that there may be a case where one and the same color is assigned to all the pixels of a column or all the pixels of a row. In this instance, picture elements of identical colors appear throughout a column or a row of the resultant picture and thus produce a "stripe" extending vertically or horizontally of the picture displayed.

Research and development efforts have therefore been made to eliminate such stripes produced in pictures produced by such a known liquid-crystal multi-color display panel structure. These research and development efforts have resulted in, for example, a liquid-crystal multi-color display panel structure disclosed in Japanese Provisional Patent Publication No. 59-61818. A multi-color display panel structure therein taught uses a pixel pattern which is arranged such that each of the picture elements of each row is to be displaced or offset by one-third of the width of each picture element from each of the picture elements of each of the adjacent rows.

In this advanced multi-color display panel structure, the pixels forming each column are assigned to primary colors which appear recurrently in the direction of column so that an identical pixel pattern appears for every adjacent three of the rows of pixels. In other words, a combination of adjacent three rows of pixels forms one pixel pattern and a combination of adjacent three rows of pixels including two of the three rows of the former combination forms another pixel pattern.

A prior-art multi-color display panel structure of this nature however has a drawback in that one and the same color appears successively in a diagonal direction of the picture produced by the panel structure. The picture elements of the identical colors thus appearing diagonally of the picture produce colored moires in the resultant multi-colored display. Colored moire images are produced not only by the series of diagonally disposed, single color picture elements but by the series of intermediate or mixed color picture elements produced by pairs of pixels paired in each row and disposed diagonally of the picture area.

There has been proposed another type of multi-color display panel structure in which image display pixels are arranged to form generally triangular triads each bridging two rows, or columns, of the array. The individual image display pixels forming each triads are assigned to three different primary colors, respectively, and are alternately inverted in the directions of columns, or rows, in and along each pair of adjacent rows, or columns. This arrangement of image display pixels is useful in that the triangular triads of the pixels produce picture elements which are more like "dots" than the picture elements produced by triads each composed of pixels disposed in a single row or in a single column.

A prior-art multi-color display panel structure of this nature however has a drawback in that two rows of pixels must be scanned concurrently to activate a triad of pixels to produce a single picture element and, for this purpose, the color signals to be supplied to the column or signal lines of the pixel array must be re-formulated for the row or scanning lines connected to the particular two rows of pixels. This results in added complexity of the control circuit for the pixel array.

It is, accordingly, an important object of the present invention to provide an improved active-matrix liquid-crystal multi-color display panel structure which will produce neither stripes nor moire-images in the multi-color display using color filters.

It is another important object of the present invention to provide an improved active-matrix liquid-crystal multi-color display panel structure which is capable of achieving far higher resolution of picture elements than in prior-art multi-color display panels.

It is still another important object of the present invention to provide an improved active-matrix liquid-crystal multi-color display panel structure which will allow the use of a simple control circuit for the control of the color signals to be supplied to the column or signal lines of the pixel array.

It is still another important object of the present invention to provide an improved active-matrix liquid-crystal multi-color display panel structure having color display pixels which are more square-shaped than those used in prior-art multi-color display panels and will thus provide ease of fabrication of the active-matrix and common electrode substrates of the panel structure.

SUMMARY OF THE INVENTION

In accordance with one outstanding aspect of the present invention, there is provided a liquid-crystal multi-color display panel structure comprising
 a substantially transparent substrate,
 a plurality of color display pixel electrodes disposed on the substrate to form a matrix having columns each extending in a first direction and rows each extending in a second direction, the first and second directions being substantially perpendicular to each other, the color display pixel electrodes consisting of those of a first type for displaying in a first preselected color, those of a second type for displaying in a second preselected color different from the first preselected color, and those of a third type for displaying in a third preselected color different from the first and second preselected colors, the color display pixel electrodes of each of the rows being each one and a half pitch distance offset from the color display pixel electrodes of the adjacent row,
 a plurality of signal lines disposed between adjacent two columns of the matrix and extending in the first direction,
 a plurality of scanning lines disposed in every other intervals between adjacent two rows of the matrix and extending in the second direction,
 a plurality of switching transistors each having a first terminal connected to one of the color display pixel electrodes, a second terminal connected to one of the signal lines, a third terminal connected to one of the scanning lines to control the conductivity between the first and second terminals, the third terminals of the switching transistors associated with the color display pixel electrodes of adjacent two rows of the matrix on both sides of the scanning lines being connected to the scanning line between the adjacent two rows, whereby one of the color display pixel electrodes of the first type in one of the adjacent two rows and each of the color display pixel electrodes of the second and third types in the other of the adjacent two rows form a generally triangular triad of color display pixels.

In a multi-color display panel structure thus constructed in accordance with the present invention, each of the color display pixel electrodes is preferably composed of split halves which are disposed along one of the scanning lines. In this instance, the switching transistors may be provided in a plurality of pairs which are respectively connected to the pixel electrodes, each pair of switching transistors being coupled to the split halves, respectively, of the pixel electrode to which the pair of switching transistors are connected.

In accordance with another outstanding aspect of the present invention, there is provided a liquid-crystal multi-color display panel structure comprising
 substantially transparent first and second substrates spaced apart from each other,
 a layer of liquid crystal intervening between the first and second substrates,
 a common electrode attached to the first substrate and having an area providing a display area of the panel structure,
 a plurality of first conductor lines extending in first directions,
 a plurality of second conductor lines extending in second directions and electrically separated from the first conductor lines,
 the first and second directions being substantially perpendicular to each other, an array of color filter sections selectively assigned to three different colors and disposed in the first and second directions on the first substrate, the array of color filter sections comprising a plurality of triads of adjacent color filters respectively assigned to the three different colors, the color filters of each of the triads being disposed to form a generally triangular pattern, the triads of color filters being alternately inverted in the first directions and being arranged in generally linear arrays in the second directions, a multiplicity of color display pixels disposed in the first and second directions on the second substrate to form a matrix of pixels arranged substantially in registry with the color filters, respectively, and in a plurality of linear arrays in the first directions or in the second directions, each of the color display pixels comprising two pixel electrodes and at least one switching device associated with the two pixel electrodes, the two pixel electrodes being disposed on both sides of one of the first conductor lines and substantially in registry with one of the color filters, each of the pixel electrodes being adapted to be capacitively coupled with the common electrode across the layer of liquid crystal, the switching device having a first terminal connected to one of the first conductor lines, a second terminal connected to one of the second conductor lines and a third terminal connected to the pixel electrode, every two of the linear arrays of the color display pixels being in registry with each of the linear arrays of the triads of color filters and the second conductor lines extending in the second directions each between the two linear arrays of the color display pixels.

BRIEF DESCRIPTION OF THE DRAWINGS

The drawbacks of prior-art liquid-crystal multi-color display panels and the features and advantages of an active-matrix liquid-crystal multi-color display panel structure according to the present invention will be more clearly understood from the following description taken in conjunction with the accompanying drawings in which like reference numerals designate similar or corresponding assemblies, units, members and elements and in which.

DESCRIPTION OF THE PRIOR ART

Figure 1:
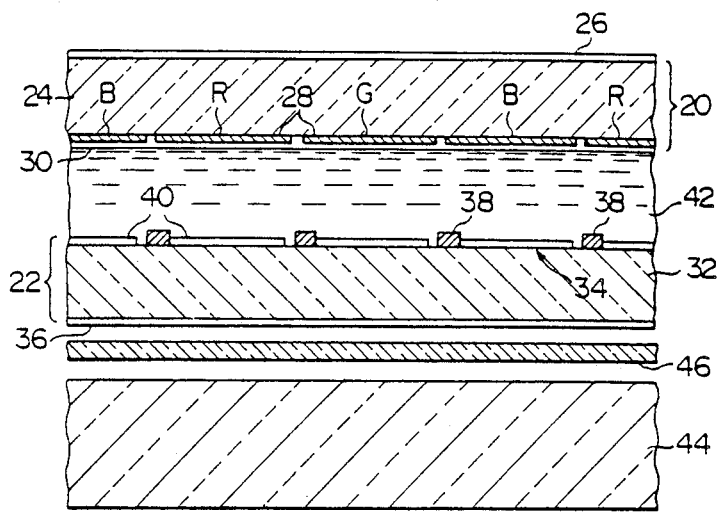
FIG. 1 is a fragmentary cross sectional view showing a typical example of the configuration of an active-matrix liquid-crystal multi-color display panel structure of the type to which the present invention generally appertains.

In FIG. 1 of the drawings is shown a typical example of the cross sectional configuration of an active-matrix liquid-crystal multi-color display panel structure. The active-matrix liquid-crystal multi-color display panel structure, which per se is well known in the art, comprises a front or outer common electrode assembly 20 and a rear or inner active-matrix assembly 22. The outer common electrode assembly 20 includes a common electrode substrate 24 of transparent glass having its front or outer face covered with a first linear polarizer film 26 and its rear or inner face covered with a color filter film 28 forming a two-dimensional or mosaic array of rectangular red, green and blue color filter sections R, G and B. The color filter film 28 in turn is covered with a common electrode 30 formed of an electrically conductive transparent film which is herein assumed to be grounded. On the other hand, the active-matrix assembly 22 includes an active-matrix substrate 32 of transparent glass having its front or outer face covered with an active layer 34 and its rear or inner face covered with a second linear polarizer film 36. The active layer 34 is formed with semiconductor switching devices 38 and pixel electrodes 40 as well as signal and scanning lines as will be described in more detail. Between the common electrode and active-matrix assemblies 20 and 22 thus constructed is sandwiched a layer 42 of field-effect liquid crystal such as for example twisted nematic liquid crystal (TNLC). As will be described in more detail, the semiconductor switching devices 38 forming part of the active layer 34 are electrically connected to the pixel electrodes 40, respectively, which are patterned to be in registration with the individual color filter sections R, G and B, respectively of the color filter film 28 forming part of the common electrode assembly 20. Where the liquid-crystal multi-color display panel structure is to implement a display panel of the light-transmission type, an appropriate illuminating device 44 to provide a parallel white light source for the panel structure is positioned at the rear of the panel structure with a light diffuser plate 46 located between the panel structure and the illuminating device 44 as shown.

Figure 2:
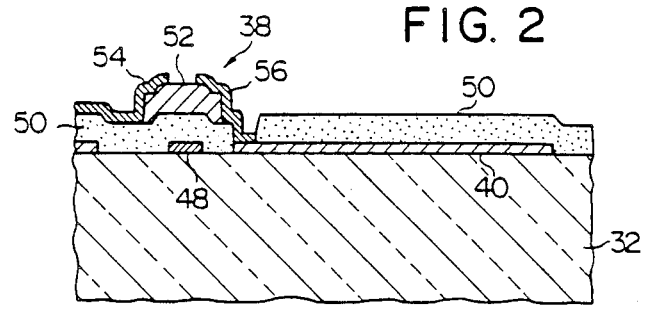
FIG. 2 is a fragmentary cross sectional view showing an example of the configuration of a switching device forming part of each of the color display pixels of the display panel structure illustrated in FIG. 1.

FIG. 2 of the drawings shows a typical example of the cross sectional configuration of the active layer 34 which forms important part of the liquid-crystal multi-color display panel structure constructed as described above. All the switching devices 38 in this active layer 34 having similar configurations and being arranged similarly with respect to the respectively associated display electrodes 40, only one of the combinations of the switching devices 38 and the display electrodes 40 is shown in FIG. 2.

Referring to FIG. 2, each switching device 38 of the active layer 34 consists of an amorphous-silicon thin-film transistor (a-Si TFT) and includes a gate electrode 48 of, for example, aluminum deposited on the outer face of the substrate 32. The gate electrode 48 herein shown forms an extension of a scanning line which is one of a number of spaced parallel gate or row lines formed on the outer face of the active-matrix substrate 32. On the outer face of the active-matrix substrate 32 is further deposited a rectangular conductive region located close to but at a spacing from the gate electrode 48. This rectangular electrode forms the pixel electrode 40 associated with the shown switching device 38. On the active-matrix substrate 32 thus formed with the electrodes 40 and 48 is further deposited an insulator layer 50 of, for example, silicon nitride. The insulator layer 50 covers not only the electrodes 40 and 48 but those areas of the surface of the substrate 32 which are not occupied by the electrodes 40 and 48. The insulator layer 50 is formed with a contact hole allowing the pixel electrode 40 to be exposed through the layer 50 in proximity to the gate electrode 48, as shown. An amorphous-silicon region 52 is formed on top of the insulator layer 50 overlying the gate electrode 48 and is covered in part with a drain region 54 and in part with a source region 56. The drain region 54, which is formed by deposition of a doped amorphous silicon, forms part of a signal line which is one of a number of spaced parallel signal or column lines formed each in part on the insulator layer 50 and extending in intersecting relationship to the above mentioned row or scanning lines formed on the active-matrix substrate 32. The source region 56, which is also formed by deposition of a doped amorphous silicon, provides an output terminal of the transistor under consideration and is coupled to the pixel electrode 40 through the contact hole formed in the insulator layer 50 as shown.

Figure 3:
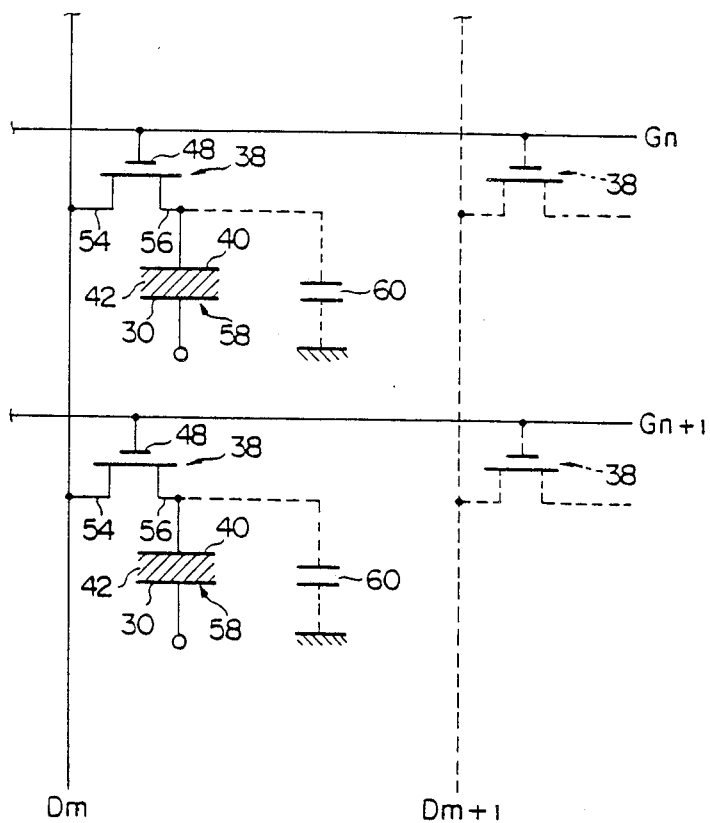
FIG. 3 is a fragmentary circuit diagram showing part of an equivalent circuit of the display panel structure constructed as illustrated in FIGS. 1 and 2.

The combination of each of the switching devices 38 and the pixel electrode 40 associated with the particular switching device 38 implement each of the pixels which form the display panel structure. FIG. 3 of the drawings shows part of an equivalent circuit of the display panel structure constructed by an array of such pixels. As shown, the display panel circuit comprises row or scanning lines $G_n$, $G_{n+1}$, ... and column or signal lines $D_m$, $D_{m+1}$, ... . The scanning lines $G_n$, $G_{n+1}$, ... are formed by the respective gate electrodes 48 of the thin-film field-effect transistors constituting the switching devices 38 and the signal lines $D_m$, $D_{m+1}$, ... are formed by the respective drain regions 54 of the transistors. Thus, each of the transistors or switching devices 38 has its gate electrode 48 connected to one of the scanning lines $G_n$, $G_{n+1}$, ..., its drain region 54 connected to one of the signal lines $D_m$, $D_{m+1}$, ..., and its source region 56 connected to the pixel electrode 40 associated with the particular switching device 38. The pixel electrode 40 are capacitively coupled with the common electrode 30 across the liquid crystal layer 42 (FIG. 1) and thus forms part of a virtual capacitor 58 which further comprises the common electrode 30 with a dielectric layer formed by the liquid crystal layer 42 interposed between the electrodes 30 and 40.

The display panel structure thus configured is driven with, for example, a scanning signal voltage of the order of 12 volts with a 30 microsecond pulsewidth and a picture signal voltage of the order of 12 volts with a 30 microsecond pulsewidth. In addition, a dc current of the voltage (+6 volts) equal to one half of the picture signal voltage is applied to the common electrode 30 of the virtual capacitor 58 to drive the liquid crystal with an alternating field. If, now, the scanning signal voltage is applied to the $n^{th}$ scanning line $G_n$ and the picture signal voltage applied to the $m^{th}$ signal line $D_m$ during a given frame, the switching device 38 located at the crossover point between these lines $G_n$ and $D_m$ is caused to shift to a conduction state. With the liquid crystal being driven with the alternating field as above noted, the common electrode 30 forming part of the common electrode assembly 20 is capacitively coupled through the liquid crystal layer 42 with the pixel electrode 40 associated with the switching device 38. The picture signal voltage applied to the drain region 54 of the switching device 38 through the signal line $D_m$ is passed to the particular pixel electrode 40 through the source region 56 of the device 38 held in a conduction state. The liquid crystal layer 42 is thus charged over its region in registry with the pixel electrode 40 by the differential between the potentials on the electrodes 30 and 40. The switching device 38 remains conductive for 30 microseconds as above noted. After the switching device 38 is turned off, however, the potential at the pixel electrode 40 is maintained throughout the duration of the frame because of the extremely high time constant with which the liquid crystal layer 42 discharges through the resistance of the transistor in a non-conduction state and the resistance of the liquid crystal per se. If the resistance of the transistor in a non-conduction state is deficient to provide such a high time constant, a storage capacitor 60 may be connected in parallel with the virtual capacitor 58 as indicated in FIG. 3.

When a picture signal voltage of either 12 volts or 0 volts is applied to the drain region 54 of the switching device 38, the liquid crystal layer 42 is charged over its region in registry with the pixel electrode 40 with a differential potential built up between the electrodes 30 and 40. The light emitted from the illuminating device 44 and passed through the activated region of the liquid crystal layer 42 and the color filter section in registry with the activated region of the layer 42 thus produces a bright colored dot on the panel structure. During a period of time when the potential on the signal line $D_m$ is equal to the potential level of 6 volts as established on the common electrode 30, there is no field imparted to the liquid crystal layer 42 which thus remains inactive although the switching device 38 may be in a conduction state.

Figure 4A:
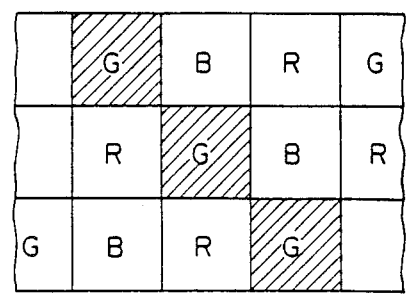
FIG. 4A is a fragmentary plan view showing a portion of a pattern of color display pixels arranged in a prior-art liquid-crystal multi-color display panel structure.
Figure 4B:
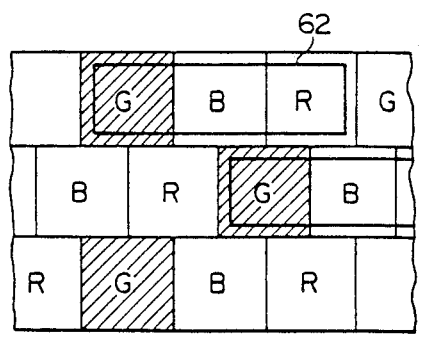
FIG. 4B is a view similar to FIG. 4A but shows a portion of a pattern of color display pixels which are to be arranged in a preferred embodiment of a liquid-crystal multi-color display panel structure according to the present invention.

A full-color liquid-crystal display panel structure using color filters for three primary colors is disclosed in Japanese Provisional Patent Publication No. 59-9636. The liquid-crystal display panel structure therein disclosed uses red (R), green (G) and blue (B) color display pixels. While such primary color display pixels are ordinarily arranged recurrently both in each row and in each column as shown in FIG. 4A (as discussed in Nikkei Electronics, Vol. 9, No. 10, page 215, 1984), the color display pixels forming an embodiment of the panel structure taught by the Publication are arranged so that the pixels assigned to the colors recurrent in each row are each half a pitch distance displaced or offset from those assigned to the colors recurrent in each of the adjacent rows as shown in FIG. 4B. According to the teachings of the Publication, such arrangement of the color display pixels "provides enhanced resolution in diagonal directions" of the display panel structure as compared with the arrangement of the pixels as shown in FIG. 4A.

The Japanese Provisional Patent Publication No. 59-9636 further states that "considering the multi-color arrangement in which color display pixels are located in simple matrix form (as shown in FIG. 4A), the pixels R, G and B (arranged as shown in FIG. 4B) are recurrent at the individual vertices of triangles and therefore provide fairly satisfactory resolution in a multi-colored graphic pattern using a relatively small number of pixels". Neither the actual display techniques to realize such improved pixel arrangement nor practical examples of the panel structures to implement such display techniques are however taught in the Publication in question.

The color display pixels in one embodiment of the panel structure proposed by the Publication are arranged so that every adjacent three of the pixels produces a single picture element as by the triad consisting of the three color display pixels G, B and R shown enclosed within a frame 62 in FIG. 4B. Each of the display pixels being assumed to be generally square shaped, the picture element produced by such a triad 62 of three color display pixels G, B and R is approximately three times larger in the direction of a row than in the direction of a column as will be readily seen from FIG. 4B. This apparently means that the resolution of picture elements which can be achieved by the panel structure under consideration is extremely lower in the directions of row than in the directions of column.

Figure 5A:
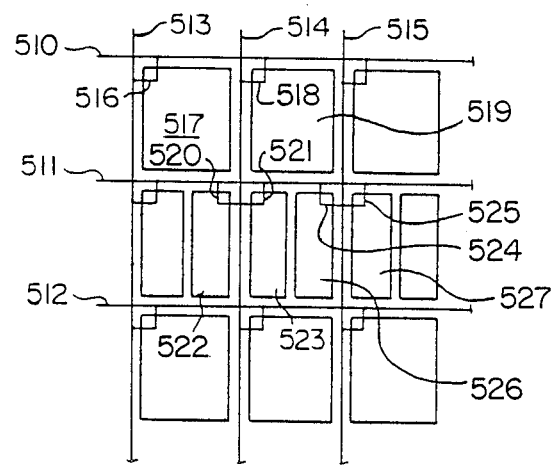
FIG. 5A is a fragmentary circuit diagram showing a portion of an array of color display pixels in another prior-art liquid-crystal multi-color display panel structure which is allegedly arranged to provide the multi-color display pixel pattern shown in FIG. 4B.

The Publication also states that "a multi-color display panel can be realized with the three primary color display pixels G, B and R arranged in triangular patterns". However, such pixel arrangement could not be in actuality realized insofar as the teachings of the Publication are relied upon. The Publication shows an active-matrix substrate having multi-color display pixels arranged as shown in FIG. 5A in which the color display pixels are located in an array including scanning lines 510 to 512 in the directions of rows and signal lines 513 to 515 in the directions of columns. Every odd number row such as the first row includes a color display pixel to be activated by a transistor 516 and an associated pixel electrode 517 connected to the scanning line 510 and signal line 513 and a color display pixel to be activated by a transistor 518 and an associated pixel electrode 519 connected to the scanning line 510 and signal line 514.

Every even number row such as the second row includes a color display pixel to be activated by a pair of transistors 520 and 521 and an associated pair of split pixel electrodes 522 and 523 jointly connected to the scanning line 511 and signal line 514 and a color display pixel to be activated by a pair of transistors 524 and 525 and an associated pair of split pixel electrodes 526 and 527 jointly connected to the scanning line 511 and signal line 515.

A color display panel structure can thus be implemented in which the color display pixels assigned to the colors recurrent in each row are each half a pitch distance offset from those assigned to the colors recurrent in each of the adjacent rows. When the pixels in the color display panel structure thus arranged are to be scanned using line sequential techniques, information signals to produce a single picture element are applied concurrently to the color display pixels G, B and R assigned to the picture element and disposed along a particular scanning line. This means that these color display pixels R, G and B are in effect arranged unidirectionally in the directions of rows and, thus, can not be said to be arranged in triangular patterns, contrary to the statement in the Publication.

Figure 5B:
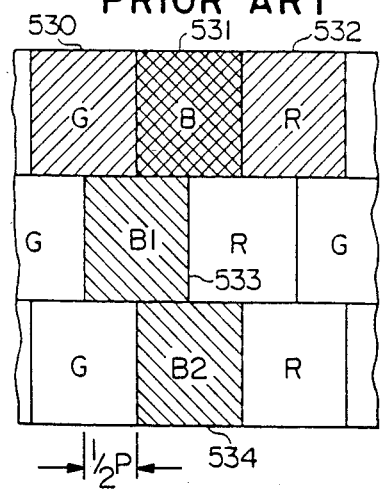
FIG. 5B is a view also similar to FIG. 4A but shows a portion of a multi-color display pixel pattern which can actually be produced by the array of color pixels arranged as shown in the circuit diagram of FIG. 5A.

Assume, furthermore, that the color display pixels in the first row are to be activated by means of the scanning line 510 and signal lines 513 to 515 with, for example, green-color, blue-color and red-color signals assigned to the signal lines 513, 514 and 515, respectively. In this instance, the color display pixels 530, 531 and 532 located along the scanning line 510 and associated with the signal lines 513, 514 and 515 will display in green, blue and red colors G, B and R, respectively, as shown in FIG. 5B. The color display pixels in the second row are likewise assumed to be activated by means of the scanning line 511 and signal lines 513 to 515 with the green-color, blue-color and red-color signal also assigned to the signal lines 513, 514 and 515, respectively. In this instance, the pixels located along the scanning line 511 and associated with the signal lines 513, 514 and 515 will also display in green, blue and red colors G, B and R, respectively, as shown in FIG. 5B. The color display pixels thus displaying in green, blue and red colors G, B and R recurrently in the second row are each half a pitch distance offset from those of the same colors recurrent in each of the adjacent first and third rows. Thus, the result is simply that a color display pixel displaying in a certain color in the second row such as, for example, the pixel 533 displaying in a blue color B is half a pitch distance offset from the pixel 531 displaying in a blue color B in the first row. In other words, a triad of adjacent pixels for three primary colors G, B and R appears only in each row and could not form a triangular triad bridging two adjacent rows. Such a distribution of the red, green and blue colors R, G and B is apparently not similar to the pattern of color display forming triangular triads of three primary colors as shown in FIG. 4B. This means that a multi-color display panel can not be realized with the three primary color display pixels R, G and B arranged and activated as taught by the Publication. A color display pixel displaying in a certain color in the second row such as the pixel 533 is directly contiguous to the pixels 532 and 534 displaying in the same color as the color for the pixel 533 and, thus, there is produced an area 531/533/534 continuous through adjacent rows of pixels and displaying in the same color with a resultant image moire produced in the picture displayed by the pixel array.

To form triangular triads of adjacent color display pixels for the three primary colors R, G and B in the pixel electrode arrangement shown in FIG. 5A, it will be necessary that, by way of example, a first primary color assigned to the pixel electrode 519, a second primary color assigned to the pair of split pixel electrodes 522 and 523, and a third primary color assigned to the pair of split pixel electrodes 526 and 528. The pixel electrode 519 is to be activated with the associated transistor 518 driven through the signal line 514. The split pixel electrodes 522 and 523 are to be activated with the respectively associated transistors 520 and 521 commonly driven through the signal line 514 and, likewise, the split pixel electrodes 526 and 527 are to be activated with the respectively associated transistors 524 and 525 commonly driven through the signal line 515.

Thus, in order to produce a triangular triad of adjacent color display pixels for the three primary colors R, G and B by means of these pixel electrodes 519, 522/523 and 526/527, it is necessary that a first-color signal is to be applied to the signal line 514 when one scanning line 510 is selected to activate the transistor 518 for the pixel electrode 519 to form a first-color display pixel and a second-color signal is applied to the same signal line 514 when another scanning line 511 is selected to activate the transistors 520 and 521 for the split pixel electrodes 522 and 523 to form a second-color display pixel. A third-color signal is applied to the signal line 515 when the scanning line 511 is selected to activate the transistors 524 and 525 for the split pixel electrodes 526 and 527 to form a third-color display pixel. This means that different color signals, viz., the first-color or second-color signals must be applied to the signal line 514 when the scanning lines 510 and 511 are selected to activate the transistor 519 for the triad-forming pixel electrode in the first row and the transistors 520 and 521 for one of the remaining triad-forming pixel electrodes in the second row. The use of such different color signals for the same signal line requires the provision of an intricately constructed control circuit for the transistor array.

The present invention thus contemplates provision of an active-matrix liquid-crystal multi-color display panel structure composed of multi-color display pixel electrodes arranged in a pattern capable of forming a generally triangular triad of color display pixels of three primary colors to provide enhanced resolution of picture elements in both the directions of rows and the directions of columns of the display.

The present invention further contemplates provision of an active-matrix liquid-crystal multi-color display panel structure composed of multi-color display pixel electrodes arranged in a pattern capable of forming a generally triangular triad of picture elements of three primary colors with predetermined color signals respectively applied to predetermined signal lines when any scanning line is selected. It being thus not required to use different color signals for each signal line, there is no need of providing an intricately constructed control circuit for the transistor-pixel electrode array included in the display panel structure.

DESCRIPTION OF THE PREFERRED EMBODIMENTS

An active-matrix liquid-crystal multi-color display panel structure according to the present invention may be constructed similarly to the liquid-crystal multi-color display panel structure described with reference to FIGS. 1 to 3 and is assumed to comprise all the component elements which form the panel structure shown in FIGS. 1 to 3.

FIRST PREFERRED EMBODIMENT

Figure 6A:
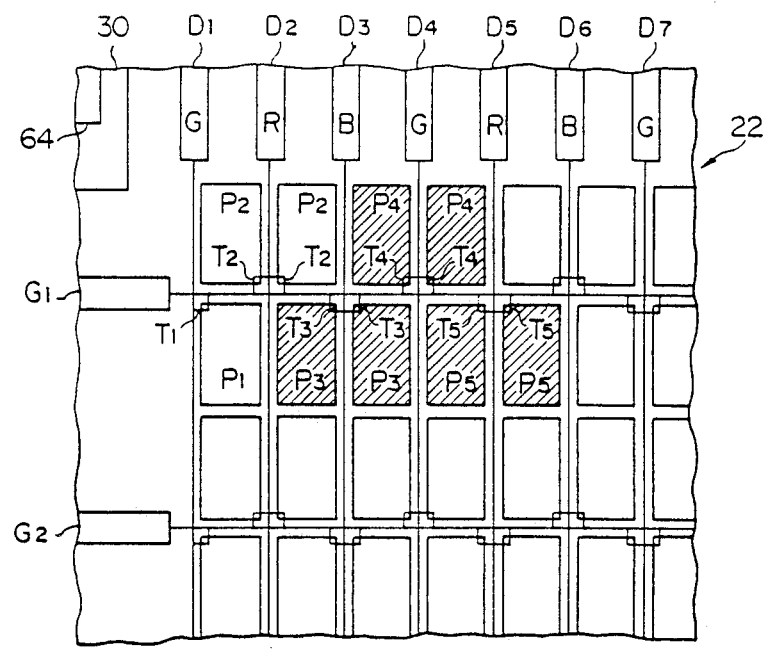
FIG. 6A is a fragmentary plan view showing a portion of the active-matrix assembly of a first preferred embodiment of an active-matrix liquid-crystal multi-color display panel structure according to the present invention.
Figure 6B:
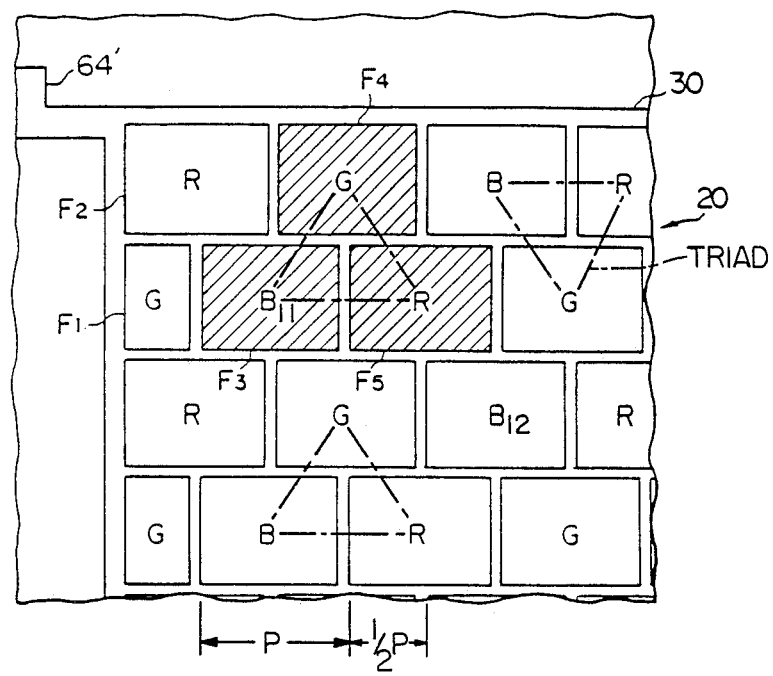
FIG. 6B is a fragmentary plan view of a portion of the common electrode assembly of the first preferred embodiment.

FIG. 6A shows a portion of the pixel arrangement on the glass substrate forming part of the active-matrix assembly of a first preferred embodiment of such a multi-color display panel structure according to the present invention. Likewise, FIG. 6B shows a portion of the mosaic color filter arrangement on the glass substrate forming part of the common electrode assembly of the panel structure. The active-matrix and common electrode assemblies including these pixel and color filter arrangements are essentially similar in construction to the active-matrix assembly 22 and common electrode assembly 20, respectively, of the panel structure shown in FIG. 1 and have a layer of a field-effect liquid crystal such as for example twisted nematic liquid crystal sandwiched therebetween though not herein shown.

Referring to FIG. 6A, the glass substrate forming part of the active-matrix assembly 22 has formed thereon a number of spaced parallel gate or scanning lines $G_1, G_2, \ldots$ extending in the directions of rows on the substrate and a number of spaced parallel signal lines $D_1, D_2, D_3, D_4, D_5, D_6, D_7, \ldots$ extending in the directions of column on the activematrix substrate. Each of the scanning lines $G_1, G_2, \ldots$ thus extends in perpendicularly crossing relationship to each of the signal lines $D_1, D_2, D_3, \ldots$ and is electrically isolated from the latter. On the active-matrix substrate is further formed an array of multi-color display pixels $P_1, P_2, P_3, P_4, P_5, \ldots$ including switching devices $T_1, T_2, T_3, T_4, T_5, \ldots$ each implemented by a thin-film transistor such as an amorphous-silicon thin-film field-effect transistor.

Each the color display pixels $P_1, P_2, P_3, \ldots$ is composed in principle of a pair of pixel electrodes which are disposed on both sides of one of the signal lines $D_1, D_2, D_3, \ldots$ and on one side of one of the scanning lines $G_1, G_2, \ldots$ as shown. The pixel electrodes disposed on one side of a particular one of the scanning lines $G_1, G_2, \ldots$ are aligned with and spaced apart from the pixel electrodes disposed on the other side of the particular scanning line. The switching devices $T_1, T_2, T_3, \ldots$ are associated with the pixel electrodes, respectively, which form the color display pixels $P_1, P_2, P_3, \ldots$. Thus, the switching devices include a first switching device $T_1$ associated with the single pixel electrode forming the first color display pixel $P_1$, a pair of second switching devices $T_2$ respectively associated with the pixel electrodes forming the second color display pixel $P_2$, a pair of third switching devices $T_3$ respectively associated with the pixel electrodes forming the third color display pixel $P_3$, and so forth. The paired switching devices associated with each color display pixel formed by paired pixel electrodes on one side of a particular scanning line are jointly connected to the particular scanning line and to a common signal line. The paired switching devices associated with each color display pixel formed by paired pixel electrodes on the other side of this particular scanning line are jointly connected to the particular scanning line and to another common signal line. Thus, the pairs of the switching devices of the color display pixels located on both sides of a particular scanning line are connected all to the particular scanning line and respectively to the signal lines $D_1, D_2, D_3, \ldots$. For example, the paired second switching devices $T_2$ respectively associated with the pixel electrodes forming the second color display pixel $P_2$ on one side of the first scanning line $G_1$ are connected jointly to the scanning line $G_1$ and to the second signal line $D_2$ and the paired third switching devices $T_3$ respectively associated with the pixel electrodes forming the third color display pixel $P_3$ on the other side of the first scanning line $G_1$ are connected jointly to the scanning line $G_1$ and to the third signal line $D_3$. The first switching device $T_1$ associated with the single pixel electrode forming the first color display pixel $P_1$ is connected to the first scanning line $G_1$ and the first signal line $D_1$.

In the active-matrix assembly 22 of the liquid-crystal multi-color display panel structure thus constructed in accordance with the present invention, the pixel electrodes are arranged in a pattern capable of producing a generally triangular triad of color display pixels of three primary colors, such as the pixel electrodes arranged to form a triangular triad of pixels $P_4$, $P_3$ and $P_5$ as shown. This arrangement of the pixel electrodes is useful for providing enhanced resolution of picture elements which are free from image moires in the directions of rows and columns of the display area. Such a triangular triad of three primary colors can be formed with predetermined color signals respectively applied to predetermined signal lines when any scanning line is selected. It being thus not required to use different color signals for the same signal line, there is no need of providing an intricately constructed control circuit for the transistor-pixel electrode array included in the display panel structure.

To the signal lines $D_1$, $D_2$, $D_3$, . . . are to be supplied color signals for green, red and blue G, R and B which are recurrent on the lines. If the first scanning line $G_1$ is accessed in the presence of such color signals, the individual color display pixels $P_1$, $P_2$, $P_3$, . . . on both sides of the scanning line $G_1$ are thus activated to eventually produce picture elements in the colors respectively assigned to the signal lines $D_1$, $D_2$, $D_3$, . . . such as a picture element of a green color by means of the single pixel electrode forming the first color display pixel $P_1$, a picture element of a red color by means of the paired pixel electrodes forming the second color display pixel $P_2$, a picture element of a blue color by means of the paired pixel electrodes forming the third color display pixel $P_3$, and so forth. When information signals to produce a single picture element are applied to the third, fourth and fifth signal lines $D_3$, $D_4$ and $D_5$, the pixel electrodes forming the third, fourth and fifth color display pixels $P_3$, $P_4$ and $P_5$, respectively, are actuated. There is, thus, eventually produced a picture element in a color mixture resulting from the three colors assigned to these particular pixels which form a triangular triad bridging two rows as shown hatched in FIG. 6A.

FIG. 6B shows the common electrode assembly 20 of the multi-color display panel structure including the active-matrix assembly 22 having the pixels arranged as hereinbefore described. The glass substrate forming part of the common electrode assembly 20 has formed thereon a mosaic array of rectangular color filter sections $F_1$, $F_2$, $F_3$, $F_4$, $F_5$, . . . , the filter sections being assigned to green, red and blue colors G, R and B which are recurrent in each row. The color filter sections respectively assigned to the green, red and blue colors G, R and B in one of adjacent two rows are each one and a half pitch distance displaced or offset (both leftwardly and rightwardly) from their respective counterparts in the other of the two rows as shown. It may be noted that the term "pitch distance" herein referred to corresponds to the measurement of each color display pixel in the direction of row. As a result of such arrangement of the color filter sections $F_1$, $F_2$, $F_3$, . . . , every adjacent three of the color filter sections in every adjacent two rows such as for example the filter sections $F_3$, $F_4$, $F_5$ form a triangular triad as shown hatched in FIG. 6B. The individual multicolor display pixels $P_1$, $P_2$, $P_3$, . . . formed by the pixel electrodes on the active-matrix substrate shown in FIG. 6A being located in registry with the color filter sections $F_1$, $F_2$, $F_3$, . . . , respectively on the common electrode substrate, the triangular triads of the color filter sections $F_1$, $F_2$, $F_3$, . . . are also in registry with the triangular triads of the pixels $P_1$, $P_2$, $P_3$, . . . , respectively.

Designated by reference numerals 64 and 64' in FIGS. 6A and 6B are transfer electrodes also included in the active-matrix and common-electrode assemblies 22 and 20, respectively. As is customary in the art, the transfer electrode 64 of the active-matrix assembly 22 shown in FIG. 6A is connected to the transfer electrode 64' which forms part of the common electrode (30 in FIG. 1) of the common electrode assembly 20.

Figure 6C:
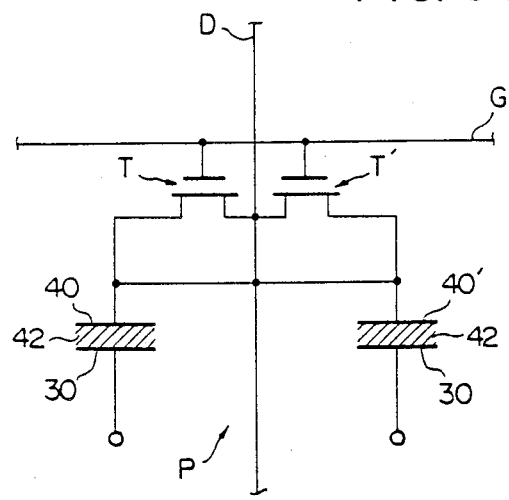
FIG. 6C is a schematic diagram showing an equivalent circuit of a pixel representing the individual color display pixels of the arrangement shown in FIG. 6A.

FIG. 6C shows an equivalent circuit of a pixel P which represents each of the multi-color display pixels forming part of the active-matrix assembly 22 shown in FIG. 6A. The color display pixel P is assumed to be located at the crossover point between a scanning line G which represents the scanning lines $G_1$, $G_2$, . . . shown in FIG. 6A and a signal line D which represents the signal lines $D_1$, $D_2$, $D_3$, . . . shown in FIG. 6A. The pixel P comprises a pair of pixel electrodes 40 and 40' which are disposed on both sides of the signal line D and on one side of the scanning line G. The pixel electrodes 40 and 40' are respectively associated with switching devices T and T' each of which is assumed to consist of an amorphous-silicon field-effect transistor as previously noted. The paired switching devices T and T' have their respective gates jointly connected to the scanning line G and their respective drains jointly connected to the signal line D. The two switching devices T and T' further have their respective sources connected to the pixel electrodes 40 and 40', respectively. These pixel electrodes 40 and 40' are capacitively coupled with the common electrode 30 across the liquid crystal layer 42 (FIG. 1) and thereby forms the previously mentioned virtual capacitor 58 with its dielectric layer formed by the liquid crystal layer 42 as shown.

Each of the multi-color display pixels $P_1$, $P_2$, $P_3$, . . . provided in the hereinbefore described embodiment is typically sized to measure 100 microns in the direction of column and 120 microns in the direction of row. In this instance, each of the paired pixel electrodes forming such a pixel may be sized to measure 80 microns in the direction of column and 60 microns in the direction of row. Thus, a single triad consisting of three of such color display pixels has an area totaling to $(100 \times 120) \times 3 = 36,000$ square microns. The multi-color display pattern shown in FIG. 5B may be designed so that a picture element to be produced by a triad of adjacent pixels assigned to the three primary colors G, B and R has the same area of 36,000 square microns. The picture element produced with such a triad of color display pixels must measure $120 \times 3 = 360$ microns in the direction of row and 100 microns in the direction of column since the triad of pixels appears exclusively in each row as previously noted. If the color display pattern of FIG. 5B is modified so that a triad of adjacent pixels for three primary colors appears exclusively in each column rather than each row, then the picture element produced with such a triad of pixels measures 100×3=300 microns in the direction of column and 120 microns in the direction of row. A picture element produced by the color display pattern of FIG. 5B or the modification of such a pattern is thus disproportionately elongated in the direction of row or in the direction of column and, for this reason, could not provide a satisfactory degree of resolution of picture elements in the resultant display.

In order that a picture element produced on the display appear as if it were a circular dot, it is required to produce a generally square-shaped picture element proportioned in a ratio of about 1:1 in the directions of row and column. Each of the triads of color display pixels to produce a such a picture element must be sized to measure about 190 microns in one direction and about 63 microns in the other to enable the triad to have the total area of about 36,000 square microns. Such a pixel is also disproportionately elongated in one direction. If the pixels assigned to the colors recurrent in one row or column are to be offset from those assigned to the colors recurrent in the adjacent row or column as implemented by the arrangement shown in FIG. 5A, two pixel electrodes each measuring about 150 microns in the direction of column and about 23 microns in the direction of row would be necessitated for each of the color display pixels. Extreme difficulties would be experienced to fabricate such slender pixel electrodes.

As will be seen from the above analyses, the described embodiment of a liquid-crystal multi-color display panel structure according to the present invention is useful for achieving far higher resolution of picture elements than in prior-art multi-color display panel structures when color display pixels of equal sizes are used. When the sizes of pixels are selected to produce picture elements of equal areas, on the other hand, the pixel electrodes used in the described embodiment of the present invention are far less slender or elongated than those used in prior-art multi-color display panel structures and will thus provide ease of fabrication of the active-matrix and common electrode substrates. It may also be added that the individual triads of the color display pixels are patterned to have identical pixel arrangements which are alternately inverted in configuration in the directions of rows and which are identical in the directions of column. As will be seen from FIG. 6B, one triad in the shown upper two rows is formed by a pixel G located in the upper row and pixels B and R in the lower row and the neighboring triad formed by a pixel G located in the lower row and pixels B and R in the upper row. By reason of such arrangement of the triads of multi-color display pixels, none of the pixels are located directly adjacent to pixels for identical colors and, for this reason, there are produced no colored moire-images which would otherwise appear in the arrangement in which pixels for identical colors are located adjacent each other.

SECOND PREFERRED EMBODIMENT

Figure 7A:
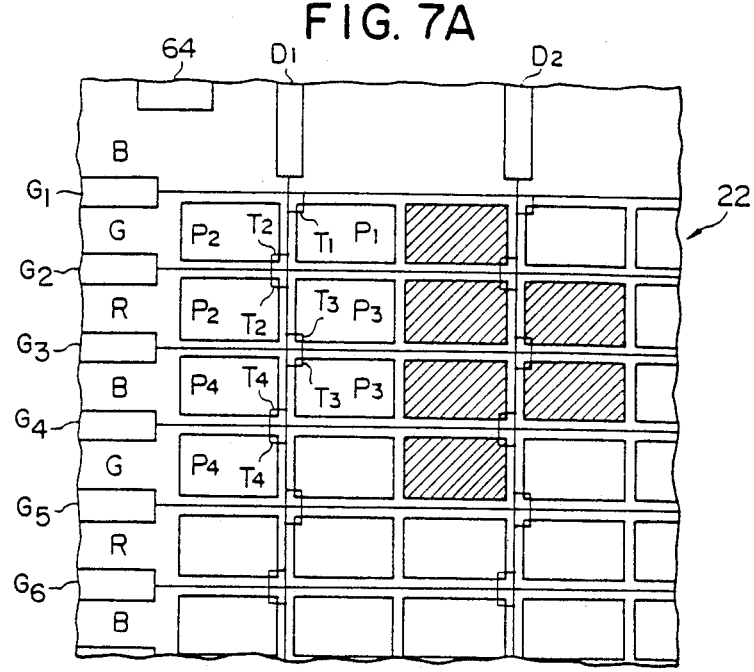
FIGS. 7A and 7B are similar to FIGS. 6A and 6B but show portions of the active-matrix and common electrode assemblies, respectively, of a second preferred embodiment of an active-matrix liquid-crystal multi-color display panel structure according to the present invention.
Figure 7B:
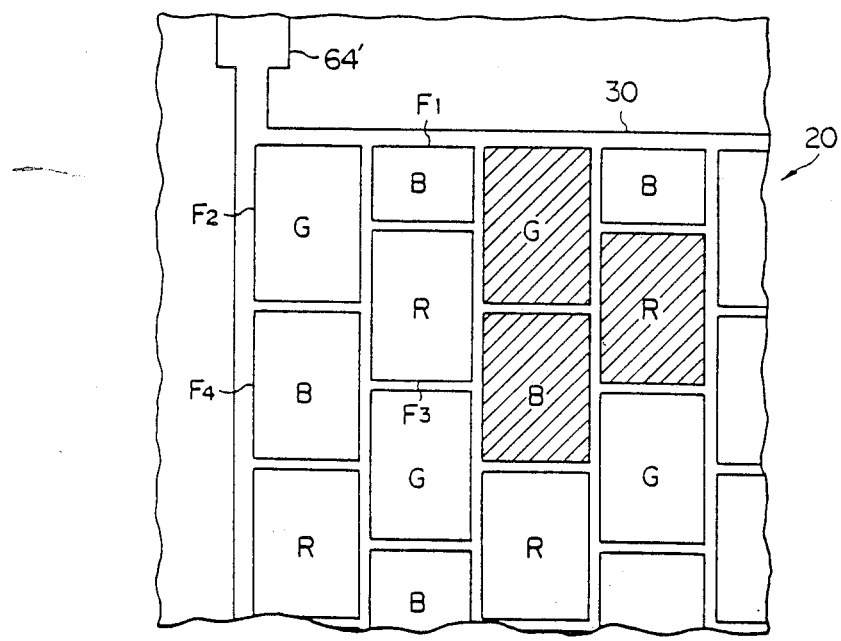

FIGS. 7A and 7B are similar to FIGS. 6A and 6B but show portions of the active-matrix and common electrode assemblies 22 and 20, respectively, of a second preferred embodiment of an active-matrix liquid-crystal multi-color display panel structure according to the present invention;

Referring first to FIG. 7A, the glass substrate forming part of the active-matrix assembly 22 has formed thereon scanning lines $G_1$, $G_2$, $G_3$, $G_4$, $G_5$, $G_6$, . . . extending in directions of rows and signal lines $D_1$, $D_2$, . . . extending in directions of column on the active-matrix substrate 22. Each of the scanning lines $G_1$, $G_2$, $G_3$, . . . is electrically isolated from each of the signal lines $D_1$, $D_2$, $D_3$, . . . . On the active-matrix substrate is further formed an array of multi-color display pixels $P_1$, $P_2$, $P_3$, $P_4$, . . . including switching devices $T_1$, $T_2$, $T_3$, $T_4$, . . . each implemented by a thin-film transistor. Each the color display pixels $P_1$, $P_2$, $P_3$, . . . is composed in principle of a pair of pixel electrodes which are disposed on both sides of one of the scanning lines $G_1$, $G_2$, $G_3$, . . . and on one side of one of the signal lines $D_1$, $D_2$, . . . as shown. The pixel electrodes disposed on one side of a particular one of the signal lines $D_1$, $D_2$, . . . are aligned with and spaced apart from the pixel electrodes disposed on the other side of the particular signal line. The switching devices $T_1$, $T_2$, $T_3$, . . . are associated with the pixel electrodes, respectively, which form the color display pixels $P_1$, $P_2$, $P_3$, . . . . Thus, the switching devices include a first switching device $T_1$ associated with the single pixel electrode forming the first color display pixel $P_1$, a pair of second switching devices $T_2$ respectively associated with the pixel electrodes forming the second color display pixel $P_2$, a pair of third switching devices $T_3$ respectively associated with the pixel electrodes forming the third color display pixel $P_3$, and so forth. The paired switching devices associated with each color display pixel formed by paired pixel electrodes on one side of a particular signal line are jointly connected to the particular signal line and to a common scanning line. The paired switching devices associated with each color display pixel formed by paired pixel electrodes on the other side of this particular signal line are jointly connected to the particular signal line and to another common scanning line. Thus, the pairs of the switching devices of the color display pixels located on both sides of a particular signal line are connected all to the particular signal line and respectively to the scanning lines $G_1$, $G_2$, $G_3$, . . . . For example, the paired second switching devices $T_2$ respectively associated with the pixel electrodes forming the second color display pixel $P_2$ on one side of the first signal line $D_1$ are connected jointly to the signal line $D_1$ and to the second scanning line $G_2$ and the paired third switching devices $T_3$ respectively associated with the pixel electrodes forming the third color display pixel $P_3$ on the other side of the first signal line $D_1$ are connected jointly to the signal line $D_1$ and to the third scanning line $G_3$. The first switching device $T_1$ associated with the single pixel electrode forming the first color display pixel $P_1$ is connected to the first signal line $D_1$ and the first scanning line $G_1$.

In the second preferred embodiment of the present invention, the scanning lines $G_1$, $G_2$, $G_3$, . . . are to be supplied with color signals for green, red and blue G, R and B which are recurrent on the lines. If the first signal line $D_1$ is accessed in the presence of such color signals, the individual color display pixels $P_1$, $P_2$, $P_3$, . . . on both sides of the signal line $D_1$ are thus activated to eventually produce picture elements in the colors respectively assigned to the scanning lines $G_1$, $G_2$, $G_3$, . . . such as a picture element of a blue color by means of the single pixel electrode forming the first color display pixel $P_1$, a picture element of a green color by means of the paired pixel electrodes forming the second color display pixel $P_2$, a picture element of a red color by means of the paired pixel electrodes forming the third color display pixel $P_3$, and so forth. When information signals to produce a single picture element are applied to the second, third and fourth scanning lines $G_3$, $G_4$ and $G_5$, the pixel electrodes forming the second, third and fourth color display pixels $P_2$, $P_3$, and $P_4$, respectively, are actuated. There is, thus, eventually produced a picture element in a color mixture resulting from the three colors assigned to these particular pixels $P_2$, $P_3$, and $P_4$ which form a triangular triad in two columns as shown. If the second signal line $D_2$ is accessed in the presence of color signals on the second, third and fourth scanning lines $G_3$, $G_4$ and $G_5$, then the three color display pixels shown hatched in FIG. 7A are activated to eventually produce picture elements in a color mixture identical with the color mixture in which the picture elements were produced by the pixels $P_2$, $P_3$, and $P_4$.

Turning to FIG. 7B, the glass substrate forming part of the common electrode assembly 20 has formed thereon a mosaic array of rectangular red, green and blue color filter sections $F_1$, $F_2$, $F_3$, $F_4$, $F_5$, ..., the filter sections being assigned to green, blue and red colors G, B and R which are recurrent in each column. The color filter sections respectively assigned to the green, blue and red colors G, B and R in one of adjacent two of the column are each one and a half pitch distance offset from their respective counterparts in the other of the two columns as shown. It may be noted that the term "pitch distance" referred to in connection with the second preferred embodiment of the present invention now corresponds to the measurement of each color display pixel in the direction of column. As a result of such arrangement of the color filter sections $F_1$, $F_2$, $F_3$, ..., every adjacent three of the color filter sections in every adjacent two columns such as for example the filter sections $F_2$, $F_3$, $F_4$ form a triangular triad. A similar triad is formed by the color filter sections shown hatched in FIG. 7B. The individual multi-color display pixels $P_1$, $P_2$, $P_3$, ... formed by the pixel electrodes on the active-matrix substrate shown in FIG. 7A being located in registry with the color filter sections $F_1$, $F_2$, $F_3$, ..., respectively on the common electrode substrate, the triangular triads of the color filter sections $F_1$, $F_2$, $F_3$, ... are also in registry with the triangular triads of the pixels $P_1$, $P_2$, $P_3$, ..., respectively. Third

PREFERRED EMBODIMENT

Figure 8A:
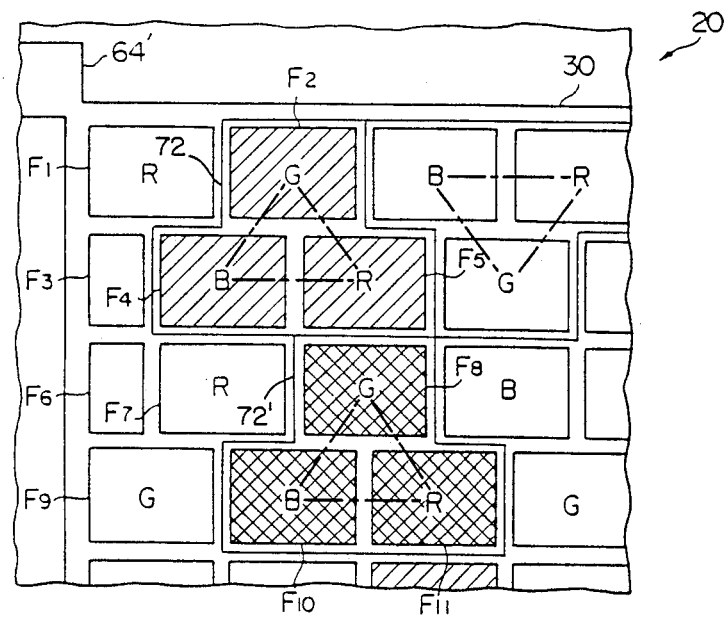
FIGS. 8A and 8B are fragmentary plan views showing portions of the active-matrix and common electrode assemblies, respectively, of a third preferred embodiment of a liquid-crystal multi-color display panel structure according to the present invention.
Figure 8B:
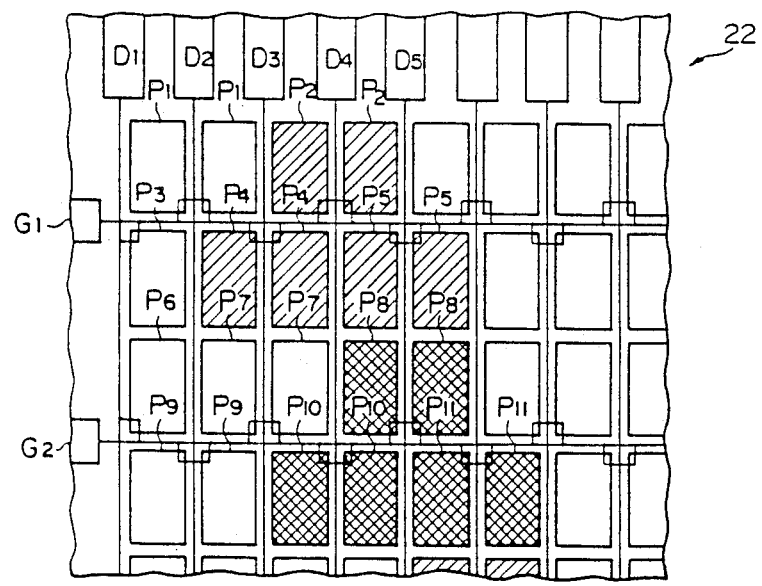

FIGS. 8A and 8B show portions of the common electrode and active-matrix assemblies 20 and 22, respectively, of a third preferred embodiment of an active-matrix liquid-crystal multi-color display panel structure according to the present invention.

Referring to FIG. 8A, the glass substrate of the common electrode assembly 20 has formed thereon a mosaic array of rectangular color filter sections $F_1$, $F_2$, $F_3$, $F_4$, .... These color filter sections $F_1$, $F_2$, $F_3$, ... are arranged to form triads of green, blue and red colors G, B and R in a pair of adjacent rows. The triads are each one-third pitch distance offset from the triads formed in the adjacent pair of adjacent rows as will be seen from the relationship between the triad composed of the color filter sections $F_2$, $F_4$ and $F_5$ which are shown simply hatched the triad composed of the color filter sections $F_8$, $F_{10}$ and $F_{11}$ which are shown crisscross hatched. In each pair of adjacent rows, furthermore, the individual triads are inverted in the directions of columns alternately along the rows. The color filter sections $F_1$, $F_2$, $F_3$, ... assigned to the green, blue and red and G, B and R in one of first adjacent two rows are each one and a half pitch distance offset, both leftwardly and rightwardly, from their respective counterparts in the immediately preceding row. Furthermore, the color filter sections assigned to the colors G, B and R in one of second adjacent two rows (including the latter one of the first adjacent two rows) are each one pitch distance offset leftwardly or two pitch distances rightwardly from their respective counterparts in the latter one of the second adjacent two rows.

Turning to FIG. 8B, the glass substrate forming part of the active-matrix assembly 22 has formed thereon scanning lines $G_1$, $G_2$, ... extending in the directions of rows and signal lines $D_1$, $D_2$, $D_3$, $D_4$, $D_5$, ... extending in the directions of column. On the active-matrix substrate is further formed an array of multi-color display pixels including switching devices. These color display pixels $P_1$, $P_2$, $P_3$, $P_4$, $P_5$, ... per se are disposed in rows and columns along the scanning lines $G_1$, $G_2$, ... and the signal lines $D_1$, $D_2$, $D_3$, ... largely similarly to the pixels in the pixel pattern hereinbefore described with reference to FIG. 6A.

Each the color display pixels $P_1$, $P_2$, $P_3$, ... is thus composed of a pair of pixel electrodes which are disposed on both sides of one of the signal lines $D_1$, $D_2$, $D_3$, ... and on one side of one of the scanning lines $G_1$, $G_2$, ... as shown. The pixel electrodes disposed on one side of a particular one of the scanning lines $G_1$, $G_2$, ... are aligned with and spaced apart from the pixel electrodes disposed on the other side of the particular scanning line. Furthermore, each of the pixel electrodes has a respectively associated switching device in each of the individual color display pixels $P_1$, $P_2$, $P_3$, .... The paired switching devices of each color display pixel including paired pixel electrodes located on one side of a particular scanning line are jointly connected to the particular scanning line and to a common signal line. The paired switching devices associated with each color display pixel formed by paired pixel electrodes on the other side of this particular scanning line are jointly connected to the particular scanning line and to another common signal line. Thus, the pairs of the switching devices of the color display pixels located on both sides of a particular scanning line are connected all to the particular scanning line and respectively to the signal lines $D_1$, $D_2$, $D_3$, .... For example, the paired switching devices respectively associated with the pixel electrodes forming the color display pixel $P_2$ on one side of the scanning line $G_1$ are connected jointly to the scanning line $G_1$ and to the signal line $D_4$ and the paired switching devices respectively associated with the pixel electrodes forming the color display pixel $P_4$ on the other side of the scanning line $G_1$ are connected jointly to the scanning line $G_1$ and to the other signal line $D_3$.

FOURTH PREFERRED EMBODIMENT

Figure 9A:
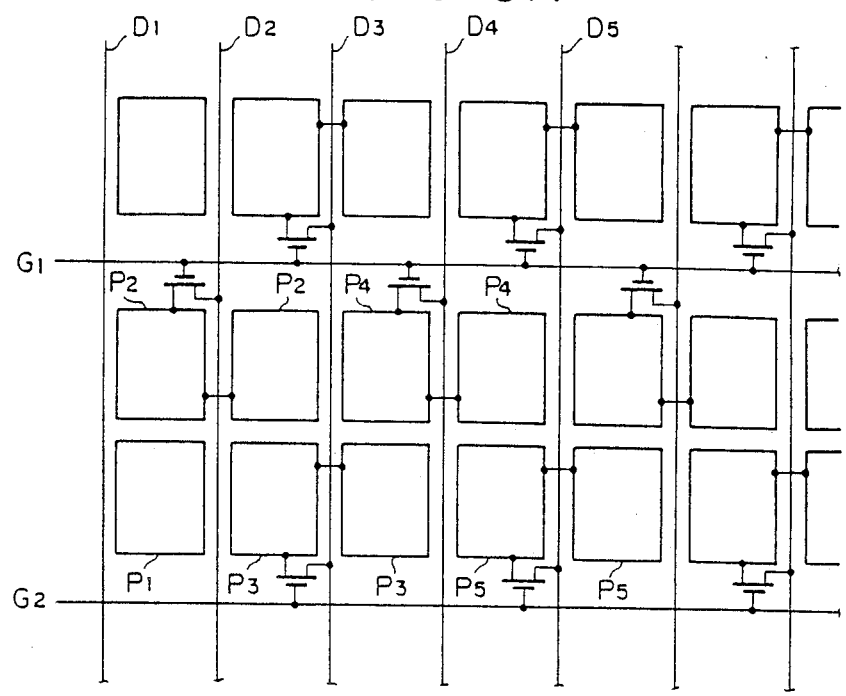
FIG. 9A is a fragmentary plan view showing a portion of the active-matrix assembly of a fourth preferred embodiment of a liquid-crystal multi-color display panel structure according to the present invention, the fourth preferred embodiment utilizing the pixel pattern illustrated in FIG. 4B.
Figure 9B:
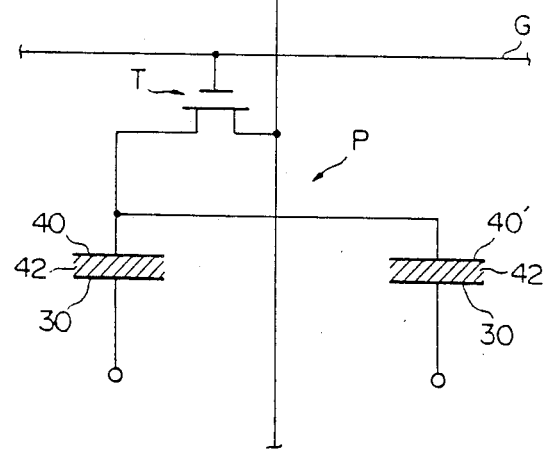
FIG. 9B is a schematic diagram showing an equivalent circuit of a pixel representing the individual color display pixels of the arrangement shown in FIG. 8A.

FIG. 9A of the drawings show a portion of the active-matrix assembly of a fourth preferred embodiment of an active-matrix liquid-crystal multi-color display panel structure according to the present invention. The embodiment herein shown is a modified version of the first preferred embodiment of the present invention as previously described with reference to FIGS. 6A and 6B. Thus, the active-matrix assembly shown in FIG. 9A comprises pixels $P_1$, $P_2$, $P_3$, $P_4$, $P_5$, ... which are all arranged similarly to their respective counterparts in the arrangement shown in FIG. 6A. While the first preferred embodiment of the present invention uses a pair of switching devices for each of the color display pixels thereof, the modified embodiment herein shown uses a single switching device commonly to the two pixel electrodes forming part of each of the pixels. FIG. 9B shows an equivalent circuit of a pixel P which represents the individual color display pixels $P_1, P_2, P_3, \ldots$ of the arrangement shown in FIG. 9A.

As shown in FIG. 9B, the color display pixel P' is assumed to be located at the crossover point between a scanning line G which represents the scanning lines $G_1$, $G_2, \ldots$ shown in FIG. 6A and a signal line D which represents the signal lines $D_1, D_2, D_3, \ldots$ shown in FIG. 6A. The pixel P' comprises a pair of pixel electrodes 40 and 40' which are disposed on both sides of the signal line D and on one side of the scanning line G. The pixel electrodes 40 and 40' are jointly associated with a single switching device T which is also assumed to consist of an amorphous-silicon field-effect transistor. The single switching device T has its gates connected to the scanning line G and its drain connected to the signal line D. The switching device T further has its source connected to both of the pixel electrodes 40 and 40'. These two pixel electrodes 40 and 40' are capacitively coupled with the common electrode 30 across the liquid crystal layer 42 (FIG. 1) and thereby forms the previously mentioned virtual capacitor 58 with its dielectric layer formed by the liquid crystal layer 42 as shown.

The fourth preferred embodiment of the present invention thus uses switching devices which account for a half in number of the switching devices necessitated in the embodiment of FIGS. 6A and 6B and is adapted to provide reduction in the production cost and the possibility of failure or erroneous operation of a liquid-crystal multi-color display panel structure.

As will have been understood from the foregoing description, a active-matrix liquid-crystal multi-color display panel structure according to the present invention is useful particularly for achieving far higher resolution of picture elements than in prior-art multi-color display panel structures when color display pixels of equal sizes are used. When the sizes of pixels are selected to produce picture elements of equal areas, the pixel electrodes used in the described embodiment of the present invention are more square-shaped than those used in prior-art multi-color display panel structures and will thus provide ease of fabrication of the active-matrix and common electrode substrates. In an embodiment in which the triads of the color display pixels have identical pixel patterns which are alternately inverted in configuration in the directions of rows, none of the pixels are located directly adjacent to pixels for identical colors so that there are produced no colored moire-images which would otherwise result from the arrangement in which color display pixels assigned to the identical colors are located adjacent or close to one another.

While it has been assumed that the switching devices used in each of the preferred embodiments of the present invention are to be constituted by thin-film amorphous-silicon field-effect transistors, such devices may be substituted by linear switching elements such as metal-insulator-metal thin-film diodes or polysilicon devices. Furthermore, the color filter sections which have been described to be provided in front of the active-matrix substrate may be located behind the active-matrix substrate if desired.

What is claimed is:

1. A liquid-crystal multi-color display panel structure comprising
   a substantially transparent substrate,
   a plurality of color display pixel electrodes disposed on said substrate to form a matrix having columns each extending in a first direction and rows each extending in a second direction, said first and second directions being substantially perpendicular to each other, said color display pixel electrodes consisting of those of a first type for displaying in a first preselected color, those of a second type for displaying in a second preselected color different from said first preselected color, and those of a third type for displaying in a third preselected color different from said first and second preselected colors, the color display pixel electrodes of each of said rows being each one and a half pitch distance offset from the color display pixel electrodes of the adjacent row,
   a plurality of signal lines disposed between two adjacent columns of said matrix and extending in said first direction,
   a plurality of scanning lines disposed in every other intervals between two adjacent rows of said matrix and extending in said second direction,
   a plurality of switching transistors each having a first terminal connected to one of said color display pixel electrodes, a second terminal connected to one of said signal lines, a third terminal connected to one of said scanning lines to control the conductivity between the first and second terminals, the third terminals of the switching transistors associated with the color display pixel electrodes of adjacent two rows of said matrix on both sides of said scanning lines being connected to the scanning lines between two adjacent rows, whereby one of the color display pixel electrodes of said first type in one of said two adjacent rows and each of the color display pixel electrodes of said second and third types in the other of said two adjacent rows form a generally triangular triad of color display pixels.

2. A multi-color display panel structure as set forth in claim 1, in which each of said color display pixel electrodes is composed of split halves which are disposed along one of said scanning lines.

3. A multi-color display panel structure as set forth in claim 2, in which said switching transistors are provided in a plurality of pairs which are respectively connected to said pixel electrodes, each pair of switching transistors being coupled to said split halves, respectively, of the pixel electrode.

4. A liquid-crystal multi-color display panel structure comprising
   substantially transparent first and second substrates spaced apart from each other,
   a layer of liquid crystal intervening between the first and second substrates,
   a common electrode attached to the first substrate and having an area providing a display area of the panel structure,
   a plurality of first conductor lines extending in first directions,
   a plurality of second conductor lines extending in second directions and electrically separated from said first conductor lines,
   the first and second directions being substantially perpendicular to each other, an array of color filter sections selectively assigned to three different colors and disposed in said first and second directions on said first substrate, said array of color filter sections comprising a plurality of triads of adjacent colors filters respectively assigned to said three different colors, the color filters of each of said triads being disposed to form a generally triangular pattern, the triangular triad patterns of color filters being alternately inverted in said first directions and being arranged in generally linear arrays in said second directions, a multiplicity of color display pixels disposed in said first and second directions on said second substrate to form a matrix of pixels arranged substantially in registry with said color filters, respectively, and in a plurality of linear arrays in said first directions or in said second directions, each of the color display pixels comprising two pixel electrodes and at least one switching device associated with the two pixel electrodes, said two pixel electrodes being disposed on both sides of one of said first conductor lines and substantially in registry with one of said color filters, each of said pixel electrodes being capacitively coupled with said common electrode across said layer of liquid crystal, said switching device having a first terminal connected to one of said first conductor lines, a second terminal connected to one of said second conductor lines and a third terminal connected to said pixel electrode, said linear arrays of the color display pixels being paired so that color display pixels in a top row of each pair are in registry and the pixels in a bottom row of each pair are in registry with each other, and in each pair of said linear arrays said color display pixels are arranged in said triangular triad patterns and each of said second conductor lines extend in said second directions between each of said pair of said linear arrays of the color display pixels.

* * * * *